No. 728,288. PATENTED MAY 19, 1903.
O. U. PETERSON.
ATTACHMENT FOR GATES.
APPLICATION FILED NOV. 28, 1902.
NO MODEL.

Witnesses:
Jas. E. Hutchinson
H. A. Farnham

Inventor:
Oliver U. Peterson,
By Swift & Co. Att'ys.

THE NORRIS PETERS CO., PHOTO-LITHO., WASHINGTON, D. C.

No. 728,288. Patented May 19, 1903.

UNITED STATES PATENT OFFICE.

OLIVER UDELL PETERSON, OF VICTORIA, ILLINOIS.

ATTACHMENT FOR GATES.

SPECIFICATION forming part of Letters Patent No. 728,288, dated May 19, 1903.

Application filed November 28, 1902. Serial No. 133,167. (No model.)

*To all whom it may concern:*

Be it known that I, OLIVER UDELL PETERSON, a citizen of the United States, residing at Victoria, in the county of Knox and State of Illinois, have invented a new and useful Attachment for Gates; and I do hereby declare the following to be a full, clear, and exact description of the invention, such as will enable others skilled in the art to which it appertains to make and use the same.

The invention relates to an attachment for gates; and it has for its object to provide a simple, inexpensive, and efficient device adapted to be readily applied to swinging gates and capable of enabling the same to be readily opened and closed without dismounting from a horse and without leaving a vehicle.

A further object is to provide an attachment of this character which will always open the gate away from the operator to prevent the gate from striking an animal.

The invention consists in the novel construction and arrangement of parts hereinafter described and shown, and particularly pointed out in the claims.

Figure 1:
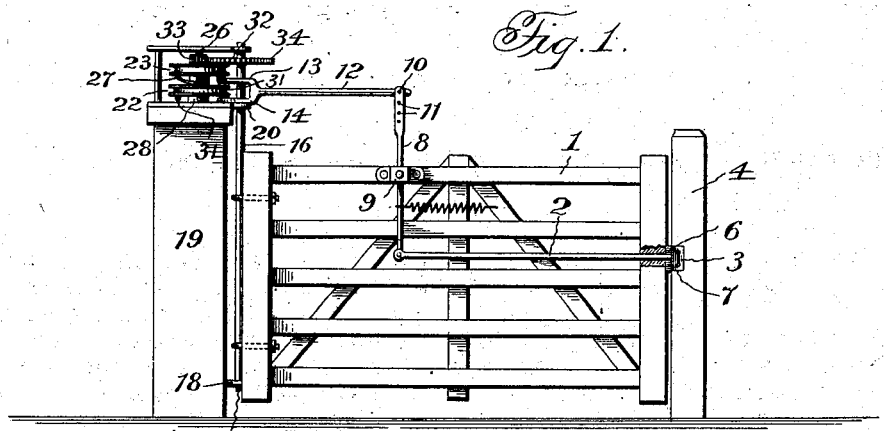
Figure 2:
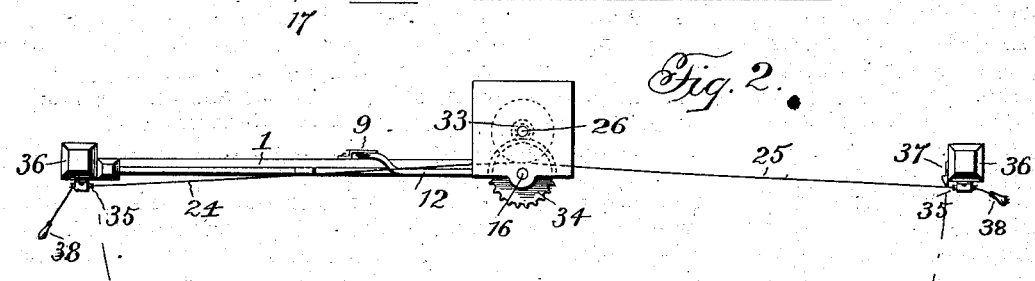
Figures 3, 4:
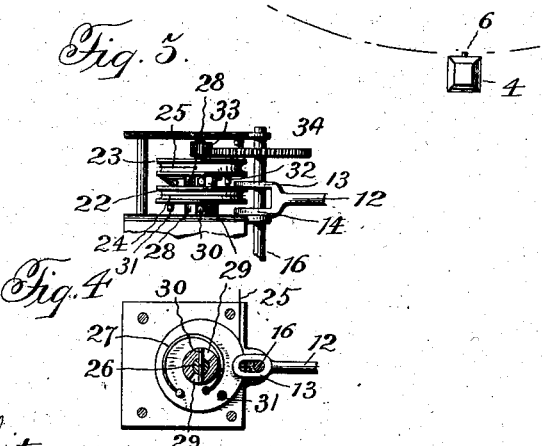
Figures 5, 6:
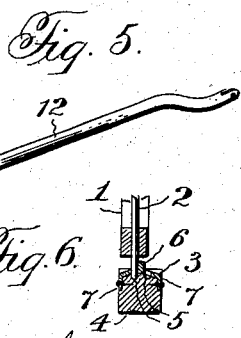

In the drawings forming a part of this specification, and in which like numerals of reference designate corresponding parts, Figure 1 is a side elevation, partly in section, of a gate constructed in accordance with this invention. Fig. 2 is a plan view, the gate being open. Figs. 3 and 4 are detail views illustrating the construction of the pulleys or wheels. Fig. 5 is a detail view of the reciprocating rod which actuates the latch. Fig. 6 is a detail sectional view illustrating the construction of the keeper of the main latch-post.

1 designates a swinging gate provided with a spring-actuated latch-rod 2, which is adapted to engage a double keeper 3 of a main latch-post 4 for holding the gate in its closed position. The keeper 3 is provided with opposite openings 5, and it has a central projecting rib 6, forming a stop and adapted to prevent the gate when closing from swinging past the latch-post. The side portions of the keeper are arranged at an angle for directing the spring-actuated latch-rod into engagement with the openings 5, and suitable side flanges 7 are preferably provided for embracing the side faces of the main latch-post.

The inner end of the spring-actuated latch-rod is pivoted to the lower end of an upright lever 8, which is fulcrumed between its ends in a bracket 9 and the upper end of which is adjustably connected, by means of a pin 10 and a series of perforations 11, to a reciprocating latch-operating rod 12. The perforations 11 are adapted to permit the gate to be raised to afford a passage-way for small animals for separating stock and also to permit the gate to swing clear of obstructions, such as snow-drifts.

The rear end of the rod 12 is enlarged and bifurcated to form upper and lower arms 13 and 14, and these arms are provided with slots 15 to receive the pintle-rod 16, which is suitably fixed to the inner or rear end of the gate. The pintle-rod, which has its lower end 17 arranged in an eye 18 of a hinge-post 19, has its upper portion passed through an eye 20 of the bottom of a casing, whereby the gate is hinged to the post 19 and is adapted to swing in either direction.

The casing is composed of top and bottom plates and suitable connecting rods or pieces, and it is adapted to be secured upon the top of an ordinary hinge-post, and it forms a housing for a pair of pulleys or wheels 22 and 23, which are grooved to receive operating cords or ropes 24 and 25, wound around the pulleys in opposite directions and adapted to rotate the same. The pulleys or wheels are mounted on a vertical shaft or spindle 26 and are connected by a spring 27, which maintains the pulleys in a normal position with relation to the shaft and which permits a limited movement of the pulleys or wheels independent of the shaft to operate the latch, as hereinafter explained. The ends of the spring are secured by suitable fastening devices to the inner adjacent faces of the pulleys or wheels, and the latter are provided at their lower faces with projecting hub portions 28, having opposite tapering recesses 29 for the reception of keys 30, which pass through the shaft or spindle 26 and which limit the independent movement of the pulleys or wheels.

The ends of the arms of the reciprocating rod 12 are rounded, and the pulleys or wheels are provided at their lower faces with studs or projections 31 and 32, arranged at diametrically opposite points, so that one of the studs or projections will lie against the rear end of the rod 12 whether the gate is opened or closed, whereby when the pulleys or wheels are rotated the latch-rod 12 will be reciprocated by the adjacent stud or projection to withdraw the latch from engagement with the keeper.

The shaft or spindle 26 carries a pinion 33, which meshes with a gear-wheel 34 on the pintle of the gate, and the diameter of the pinion is much less than the diameter of the gear-wheel, so that only a light pull will be required to operate the gate. The upper end of the pintle is also arranged in an eye of the top plate of the casing, and the slots of the rear end of the rod 12 are of a length to permit the necessary reciprocation of the latch. The operating ropes or cables extend to guide-pulleys 35 of uprights or supports, which are provided with supplemental keepers 37. The uprights or supports 36 are provided with suitable casings for the guide-pulleys.

The outer ends of the ropes or cables are provided with weighted grips or handles 38 and are adapted to be readily pulled to operate the gate; but various other operating means may be employed, and I desire it to be understood that various changes in the form, proportion, and minor details of construction within the scope of the claims may be resorted to without departing from the spirit or sacrificing any of the advantages of the invention.

What I claim is—

1. In an attachment for gates, the combination with a latch, and a gear-wheel mounted on a pintle-rod, of a reciprocating rod slidably connected with the pintle and connected with the latch, a shaft having a pinion meshing with the gear-wheel, pulleys mounted on the shaft and provided with means for actuating the rod, and operating mechanism for rotating the pulleys, substantially as described.

2. An attachment for gates comprising a reciprocating rod adapted to be connected with a latch, means for guiding the rod, a gear adapted to be connected with a gate, pulleys provided with means for actuating both the rod and the gear, and operating mechanism for rotating the pulleys, substantially as described.

3. In an attachment for gates, the combination with a gate having a latch and provided with a pintle, of a gear mounted on the pintle, a reciprocating rod connected with the latch and guided on the pintle, pulleys provided with means for actuating the rod, a pinion connected with the pulleys and meshing with the gear, and operating mechanism for rotating the pulleys, substantially as described.

4. The combination of a gear connected with a gate, a reciprocating latch-operating rod, means for guiding the same, yieldably-connected pulleys provided with means for actuating the rod, a shaft receiving the pulleys and having a pinion meshing with the gear, and operating mechanism for rotating the pulleys, substantially as described.

5. The combination of a gear connected with a gate, a reciprocating latch-operating rod, a shaft provided with keys, pulleys mounted on the shaft and provided with means for engaging the rod and having tapering recesses receiving the keys, a pinion also mounted on the shaft and engaging the gear, a spring connecting the pulleys, and means for rotating the same, substantially as described.

6. The combination of a gate having a pintle, and provided with a latch, a bifurcated rod slotted to receive the pintle and connected with the latch, a casing, a shaft mounted in the casing, pulleys having studs for engaging the rod, a spring connecting the pulleys, a gear mounted on the pintle, a pinion mounted on the shaft and meshing with the gear, and means for operating the pulleys, substantially as described.

In testimony whereof I have hereto affixed my signature in the presence of two witnesses.

OLIVER UDELL PETERSON.

Witnesses:
L. R. NORTON,
J. P. CLARK.